United States Patent

Buchanan et al.

[11] Patent Number: 5,865,986
[45] Date of Patent: Feb. 2, 1999

[54] HYDROCARBON CONVERSION

[75] Inventors: John Scott Buchanan, Trenton; Jane C. Cheng, Clarksburg, both of N.J.; David G. Freyman, Kenner, La.; Werner Otto Haag, Lawrenceville, N.J.; Mohsen N. Harandi, Langhorne, Pa.; Dominick N. Mazzone, Wenonah; Roger A. Morrison, Lambertville, both of N.J.; Norman J. Rouleau, Yardley, Pa.; Charles M. Sorensen, Wilmington, Del.; Hye Kyung C. Timken, Woodbury, N.J.; Robert Adams Ware, Wyndmoor, Pa.

[73] Assignee: Mobil Oil Corporation, Fairfax, Va.

[21] Appl. No.: 552,769

[22] Filed: Nov. 3, 1995

Related U.S. Application Data

[63] Continuation-in-part of Ser. No. 314,564, Sep. 28, 1994, abandoned, Ser. No. 367,569, Jan. 3, 1995, abandoned, and Ser. No. 314,566, Sep. 28, 1994, abandoned.

[51] Int. Cl.$^6$ .............................. C10G 35/06; C07C 4/18
[52] U.S. Cl. .............................. 208/65; 208/66; 208/134; 208/138; 585/319; 585/322; 585/486; 585/489
[58] Field of Search .................................. 208/62, 63, 64, 208/65, 66, 70, 138, 139, 140, 141; 585/314, 315, 316, 319, 322, 475, 476, 483, 485, 486, 488, 489

[56] References Cited

U.S. PATENT DOCUMENTS

| | | |
|---|---|---|
| 3,395,094 | 7/1968 | Weisz ........................................ 208/62 |
| 4,078,990 | 3/1978 | Brennan et al. ........................... 208/64 |
| 4,157,355 | 6/1979 | Addison .................................... 585/321 |
| 4,211,886 | 7/1980 | Tabak et al. ............................. 585/321 |
| 4,341,622 | 7/1982 | Tabak et al. ............................... 208/66 |
| 4,351,979 | 9/1982 | Chester et al. ........................... 585/481 |
| 5,082,984 | 1/1992 | Brown et al. ............................. 585/481 |
| 5,376,259 | 12/1994 | Kline et al. ............................... 208/65 |
| 5,396,010 | 3/1995 | Harandi et al. .......................... 585/418 |
| 5,472,593 | 12/1995 | Gosling et al. ............................. 208/65 |
| 5,792,338 | 8/1998 | Gosling et al. ............................. 208/65 |

FOREIGN PATENT DOCUMENTS

6-145672  5/1994  Japan.

*Primary Examiner*—Bekir L. Yildirim
*Attorney, Agent, or Firm*—Penny L. Prater; Malcolm D. Keen

[57] ABSTRACT

This is a process for upgrading a petroleum naphtha fraction. The naphtha is subjected to reforming and the reformate is cascaded to a benzene and toluene synthesis zone over a benzene and toluene synthesis catalyst comprising a molecular sieve of low acid activity. The preferred molecular sieve is steamed ZSM-5. The benzene and toluene synthesis zone is operated under conditions compatible with the conditions of the reformer such as pressures of above about 50 psig (446 kPa) and temperatures above about 800° F. (427° C). In one aspect of the invention, the benzene and toluene synthesis catalyst includes a metal hydrogenation component such as cobalt, nickel, platinum or palladium. In one mode of operation, the benzene and toluene synthesis catalyst replaces at least a portion of the catalyst of the reformer. The process produces a product containing an increased proportion of benzene and toluene, and a reduced proportion of C8 aromatics, particularly ethylbenzenes, as compared to the reformate.

26 Claims, 2 Drawing Sheets

HYDROCARBON CONVERSION

CROSS-REFERENCE TO RELATED APPLICATIONS

This is a continuation-in-part of Ser. No. 08/314,564 filed on Sep. 28, 1994; Ser. No. 08/314,566 filed on Sep. 28, 1994, and Ser. No. 08/367,569 filed on Jan. 3, 1995, all now abandoned, which are each incorporated herein by reference in their entireties.

FIELD OF THE INVENTION

This invention relates to a process for conversion of hydrocarbons. More specifically, the invention relates to a process for upgrading a hydrocarbon feedstock by reforming followed by hydrodealkylation.

BACKGROUND OF THE INVENTION

Catalytic reforming of naphtha feedstocks is well known in the petroleum refining industry. Most naphtha feeds contain large quantities of naphthenes and paraffins and consequently they have low octane numbers. In catalytic reforming these components go through a variety of hydrocarbon conversions resulting in a gasoline product of improved octane number. Some of the more important conversion reactions include dehydrogenation of naphthenes to aromatics and dehydrocyclization of normal paraffins to isoparaffins. Less desirable reactions which commonly occur include hydrocracking of paraffins, naphthenes and dealkylation of alkylaromatics to produce gaseous hydrocarbons such as methane and ethane. Because of these less desirable reactions, an important objective of catalytic reforming is to rearrange the structure of the hydrocarbon molecules to form higher octane products without any significant change in the carbon number distribution of the stock.

The reforming reactions are, typically, catalyzed by catalysts comprising porous supports, such as alumina, that have dehydrogenation promoting metal components impregnated or admixed therewith. Platinum on alumina and more recently bimetallics such as platinum and rhenium on alumina are examples of these catalysts. Such catalysts are described in U.S. Pat. Nos. 3,415,737 and 3,953,368.

Other known reforming catalysts have been based on zeolites containing a noble metal component such as platinum. U.S. Pat. No. 4,582,815 describes a silica-bound zeolite catalyst composition for various hydrocarbon conversions including reforming. U.S. Pat. No. 4,839,027 describes a reforming process which employs an intermediate or large pore zeolite bound with a low acidity refractory oxide binder material and containing at least one metal species selected from the platinum group metals. Typically, reforming is operated at pressures below about 350 p.s.i.g. (2,514 kPa) and in the presence of hydrogen.

Procedures for upgrading a reformate to achieve selective rearrangement and increased yields of high octane products have been described in several United States patents. These procedures include selective hydrocracking, see U.S. Pat. No. 3,806,443; low severity hydrocracking, see U.S. Pat. No. 3,847,792; and aromatics alkylation, see U.S. Pat. No. 3,767,568.

Thermally treated zeolites have been described in U.S. Pat. No. 3,923,641 where a high activity zeolite beta catalyst is used in hydrocracking a reformate by heating the catalyst at high temperatures, ranging from 400° F. (204° C.) to 1,700° F. (927° C.) for one to 48 hours to achieve a strongly acidic material. A broad range of hydrocracking conditions are described including temperatures ranging from 400° F. (204° C.) to 600° F. (316° C.) and pressures from 0 to 2,000 psig (101.4 kPa to 13,891 kPa). In U.S. Pat. No. 4,016,218 a process for alkylating aromatic hydrocarbons over a thermally modified crystalline aluminosilicate is described.

Various methods for steam treating zeolites to enhance the properties of the zeolite have been described. Steaming a zeolite to improve the stability during hydrocarbon conversion reactions is disclosed in U.S. Pat. Nos. 4,429,176 and 4,522,929. The zeolite of improved stability is made by mildly presteaming the catalyst under controlled conditions of temperature, time and steam partial pressure. A method for enhancing the activity of a zeolite catalyst by forming the catalyst into a composite with an alumina binder and steaming the composite is described in U.S. Pat. No. 4,559,314.

It is known that benzene, toluene and xylenes can be produced from a reformate feed containing benzene and alkyl aromatics over a zeolite of reduced activity, such as steamed ZSM-5 under high temperature conditions, see U.S. Pat. No. 4,224,141. However, the described conditions also require low pressures, below about 100 psig (791 kPa), preferably lower, and an absence of hydrogen. These conditions are incompatible with the pressure conditions and the presence of hydrogen in the reformer so the feed is not used directly from the reformer. Rather, it is first fractionated and a portion of the effluent is sent to the hydrocracker.

During processes for the production of hydrocarbons employing an acid zeolite catalyst, depletion of catalytic activity occurs. This catalyst deactivation can generally be ascribed to the nature of the feed, the nature of the catalyst itself and/or the processing conditions. More specifically, catalyst deactivation can result from the deposition of organic matter onto the catalyst which is typically referred to as "coking", or from a reduction in the zeolite framework aluminum content. In both instances, it is the acidic function of the zeolite catalyst that becomes diminished or destroyed.

Some catalysts which have become deactivated because of coking can be regenerated by burning in an oxygen-containing gas or removing the organic matter from the zeolite in a hydrogen-containing gas. See U.S. Pat. No. 4,358,395.

Although burning in an oxygen-containing gas and treatment with hydrogen are known to regenerate certain catalysts, these processes in general require high temperature and are costly. Furthermore, the regeneration often fails to fully restore all properties so that the regenerated catalyst is not considered to be the same as a "fresh" catalyst. However, as mentioned earlier, the regeneration is only known to regenerate catalysts which have become deactivated from coking. Such techniques are not recognized as being effective to reactivate a zeolite which has been deactivated because of framework dealuminization.

During certain catalytic conversion processes, such as the methanol-to-gasoline (MTG) process, conditions are such that zeolite framework dealuminization might be expected. For instance, MTG processing is typically conducted at elevated temperatures. Water vapor produced is known to attack aluminum atoms present in the zeolite framework and to remove them in the form of aluminum oxide and/or hydroxide clusters. The loss of framework aluminum is detrimental to these catalysts since catalytic activity is generally attributed to framework aluminum atoms and/or cations associated with aluminum atoms.

U.S. Pat. No. 4,919,790 discloses a method for reactivating a deactivated zeolite catalyst so that the reactivated catalyst may be used for hydrocarbon dewaxing. A method for upgrading a reformate which utilizes a catalyst deactivated by MTG processing is not described.

Recently, it has been reported that pollution can be reduced by lowering gasoline endpoint to result in a product endpoint where, in a standard ASTM distillation, 90 volume percent of the gasoline distills below about 270° F. (132° C.) to 350° F. (177° C.) ($T_{90}$). Based on this, there have been regulatory proposals, particularly in the State of California, to require gasoline to meet a maximum $T_{90}$ specification of 300° F. (149° C.). Meeting this $T_{90}$ permits only 10% of the hydrocarbons in gasoline to boil above 300° F. (149° C.). A significant boiling range conversion of heavy naphthas will be required to meet this goal.

BRIEF DESCRIPTION OF THE INVENTION

A process has been discovered for producing benzene, toluene and xylenes while enhancing the octane value of the gasoline boiling range materials of a naphtha fraction of low octane value and high gasoline end boiling range.

The process of this invention can increase the benzene production of a reformer by more than 10% while producing less $C_9$+ hydrocarbons, through hydrodealkylation reactions.

The invention is directed to a multi-step integrated process for upgrading a petroleum naphtha comprising the steps of (a) introducing the naphtha to a catalytic reforming zone comprising a plurality of operatively connected fixed bed or moving bed catalyst zones, the catalyst zones being maintained under reforming conditions of temperature and pressure to provide an intermediate comprising aromatics and paraffins; and (b) cascading the reaction product to a benzene and toluene synthesis zone comprising at least one fixed bed or moving bed catalytic zone operatively connected to the catalytic reforming zone, the benzene and toluene synthesis zone being maintained under conditions of temperature and pressure compatible with the reforming conditions of step (a), the reaction zone containing a catalyst, preferably comprising a molecular sieve of low acid activity, typically, as determined by an alpha value of less than about 150, more specifically, less than about 100, even more specifically, less than about 60, to provide a reaction product having more benzene and toluene than the intermediate.

An important feature of the invention is that the catalytic reforming zone and the benzene and toluene synthesis zone are in series flow arrangement preferably without intermediate separation of the reformer effluent so that the two zones are operated under compatible conditions including hydrogen circulation rate and pressure.

In one embodiment of the invention, a low acidity molecular sieve can be provided by using a deactivated catalyst from another refinery process. In this respect, the other refinery process provides the catalyst treatment conditions needed to reduce catalyst acidity.

Prior to the contacting with the reformate, the deactivated catalyst can be regenerated by conventional techniques such as by burning in an oxygen-containing gas to remove at least a major part of the accumulated coke from the catalyst or by hydrogen regeneration.

DETAILED DISCUSSION OF THE INVENTION

Reforming

In the present invention a petroleum naphtha characterized by a boiling range of $C_5$ to about 450° F. (232° C.), typically boiling up to about 400° F. (204° C.), is contacted with a reforming catalyst under reforming conditions selected to produce a reaction product comprising aromatics and paraffins. Typically, the hydrocarbon feed contains a percentage of components which boil above 300° F. (149° C.). The components boiling above 300° F. (149° C.) usually comprise at least 10% of the entire feed. In general, the feed can be further characterized by the presence of $C_9$+ hydrocarbons which are usually present in an amount of less than about 40 wt. %, typically 25 wt. % to 40 wt. %, based on the entire weight of the feed. Yield advantages can be achieved by increasing the cut-point of the reformer feed to boost $C_9$+ aromatics. Alternatively, a $C_9$+ aromatic cofeed can be employed in which case the feed can contain over 40 wt. % $C_9$+ hydrocarbons, typically, up to 50 wt. % $C_9$+ hydrocarbons. Since $C_6$− components are olefin precursors, yield loss is minimized by removing them from the feed. Thus, the feed can be substantially devoid of $C_6$− hydrocarbons.

The reformate is formed under typical reforming conditions designed to promote dehydrogenation of naphthenes, isomerization of paraffinic hydrocarbons and dehydrocyclization of non-aromatic hydrocarbons. Thus, in the reforming operation of this invention, a relatively low octane aromatic deficient hydrocarbon material is converted to a relatively high octane aromatic rich product. The reformer typically employs a bimetallic catalyst arranged in a plurality of reaction zones. Typical reforming catalysts include platinum/alumina, platinum-rhenium/alumina and platinum-iridium/alumina.

The reforming process can be continuous, cyclic or semi-regenerative. The process can be in a fixed bed, moving bed, tubular, radial flow or fluid bed. Typically, a hydrogen to hydrocarbon mole ratio of up to 8:1 is employed to maintain a reasonable catalyst cycle length.

The conditions of reforming typically include temperatures of at least about 800° F. (427° C.) to about 1050° F. (565° C.) and pressures from about 50 psig (446 kPa) to about 500 psig (3,549 kPa), more specifically from about 50 psig (446 kPa) up to and including 450 psig (3204 kPa). It may often be preferred to employ pressures in the lower ranges e.g. 50 psig (446 kPa) to about 125 psig (963 kPa) to encourage formation of aromatics which supply precursers for the preferred reactions of the benzene and toluene synthesis zone and enhance yield of the preferred products. The hydrogen-to-hydrocarbon ratio ranges from about 0.5 to about 20 and the liquid hourly space velocity can be in the range of about 0.1 to 10, usually about 0.5 to 5.

Reformate Upgrading

The reformate product along with the hydrogen and light hydrocarbons present in the reformer reactor effluent is cascaded to a benzene and toluene synthesis zone which is operatively connected to the reforming zone. Typically, the temperature and pressure conditions established in the reformer are not modified and in one convenient mode of operation, employing a conventional reformer having a plurality of catalytic reactor beds, at least a portion of the catalytic material of the last reactor of the reformer is replaced with the benzene and toluene synthesis catalyst of this invention.

Typically, no engineering modifications to the conventional reformer reaction and hydrogen circulation sections are required to accomplish the benzene and toluene forming reactions, e.g. increasing the temperature of the last reactor to makeup for any endotherm which occurs during reforming or extra hydrogen circulation. However, it is within the scope of this invention to provide facilities for preheating or cooling of the reformer effluent up to 280° F. (138° C.) to optimize performance of the benzene and toluene synthesis reactor.

Since a reaction mechanism through which the benzene and toluene, and usually xylenes, are formed is typically hydrodealkylation of aromatics, this term will be employed hereinafter. The hydrocarbon conversion reactions which occur in this zone which enhance production of $C_6$ to $C_8$ aromatics, particularly benzene and toluene include disproportionation of $C_7+$ aromatics, transalkylation of $C_6+$ aromatics, dealkylation of aromatics, alkylation of aromatics, dehydration of naphthenes, and cracking of linear and lower branched paraffins. Dehydrocyclization can also occur. There is no significant net consumption or generation of aromatic rings. Furthermore, ethylbenzene content of the reformate is often reduced and xylenes are usually unaffected or increased. The least desirable reaction is paraffin cracking and the consequent formation of coke and olefins (which alkylate the aromatics). The process conditions minimize these reactions by employing a low acid activity molecular sieve, which activity is determined, for example, by the alpha value.

The process of this invention can be carried out in a variety of reactor configurations. For example, in a reforming process comprising a plurality of reaction beds, the hydrodealkylation catalyst can be placed in the last reaction bed of the reformer. Thus, in a three-reaction bed reforming process, the third reaction bed will contain the hydrodealkylation catalyst so that the hydrocarbons contact this catalyst as they exit the reformer. However, in an alternative embodiment, a separate reactor containing the hydrodealkylation catalyst is placed in series with the reformer. Advantages of this configuration include flexibility in operation which permit modification of the feed temperature and control of reformer catalyst rejuvenation by allowing the hydrodealkylation reactor to be isolated during rejuvenation of the reforming catalyst which maximizes the life of the hydrodealkylation catalyst.

When a separate hydrodealkylation reactor is employed, the reactor may be a fixed, moving or fluidized bed or a tubular regime, regardless of the reactors of the reforming zone. To avoid mixing of the hydrodealkylating catalyst and the reforming catalyst, a separate hydrodealkylation reactor may especially be useful if the reformer contains a moving or fluidized catalyst bed.

When a moving bed reformer is employed, it may be useful to place a stationary bed of the hydrodealkylation catalyst inside the reformer, typically in the last stage. Johnson screens or other containers may be used to hold the hydrodealkylation catalyst bed.

The upgrading reactor is maintained at temperatures ranging from about 500° F. (260° C.) to about 1,500° F. (815° C.), specifically, above about 600° F. (315° C.) to 1,100° F. (538° C.), more specifically above about 800° F. (427° C.) to about 1000° F. (510° C.). Appropriate pressures are, usually, greater than atmospheric, above about 20 psig (239 kPa), specifically above about 50 p.s.i.g. (446 kPa) upto about 1000 p.s.i.g. (6996 kPa), specifically, about 100 p.s.i.g. (791 kPa) which are compatible with the conditions of the reformer. Typically, because the feed contains hydrogen, the reaction is conducted in the presence of hydrogen. The hydrogen to hydrocarbon mole ratio can range from about 0.5 to about 10. Hydrogen can be added as quench to control the reaction. The catalyst space velocity is, typically, less than about 75 W.H.S.V., more typically less than about 50 W.H.S.V., even more typically from about 5 to about 30 W.H.S.V.

Upgrading Catalyst

It is contemplated that any molecular sieve having a pore size appropriate to admit the bulky $C_9+$ hydrocarbons and catalytically dealkylate the aromatics can be employed in this reformate upgrading process.

The molecular sieve which catalyzes these reactions is usually an intermediate or large pore size zeolite having a silica-to-alumina mole ratio of at least about 12, specifically from about 12 to 2000. The zeolite is usually characterized by a Constraint Index of about 0.5 to 12 specifically about 1 to 12 as described in U.S. Pat. No. 4,088,605.

Typically, the molecular sieve of choice is a zeolite. Zeolites contemplated include ZSM-5, ZSM-11, ZSM-12, ZSM-35, ZSM-38, zeolite beta and other similar materials. U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

Additional molecular sieves contemplated include ZSM-23, described in U.S. Pat. No. 4,076,842; MCM-22 described in U.S. Pat. No. 4,962,256; MCM-36 described in U.S. Pat. No. 5,266,541 and ZSM-3 described in U.S. Pat. No. 3,415,736.

Molecular sieves also contemplated for use in this process are the crystalline silicoaluminophosphates. Silicoaluminophosphates (SAPO) are described in U.S. Pat. Nos. 4,440,871; 4,898,722 and 4,778,780.

Aluminophosphates. e.g. ALPO and VPI catalysts and other metal aluminophosphates are also contemplated. These are described in U.S. Pat. No. 5,304,698.

Xylene selective molecular sieves may be preferred in some refineries. Materials having pores of sufficient size for xylene selectivity include zeolite beta, Y, USY, mordenite, ZSM-12, ZSM-20, MCM-36, MCM-56, MCM-58 and MCM-60. For control of product benzene to xylene ratio it may be desirable to employ a mixture of an intermediate pore size zeolite and a large pore size zeolite. An example of such a mixture is ZSM-5 and zeolite beta.

The specific molecular sieves described, when prepared in the presence of organic cations may be activated by heating in an inert atmosphere at 1000° F. (538° C.) for one hour, for example, followed by base exchange with ammonium salts followed by calcination at 1000° F. (538° C.) in air. The presence of organic cations in the forming solution may not be absolutely essential. More generally it is desirable to activate this type catalyst by base exchange with ammonium salts followed by calcination in air at about 1000° F. (538° C.) for from about 15 minutes to about 24 hours.

Natural zeolites may sometimes be used if converted to a zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite.

When synthesized in the alkali metal form, the zeolite is conveniently converted to the hydrogen form, generally by intermediate formation of the ammonium form as a result of ammonium ion exchange and calcination of the ammonium form to yield the hydrogen form.

The zeolites in their fresh state may be in the hydrogen form or they may be base exchanged or impregnated to contain ammonium or a metal cation component. The metals that may be present include any of the cations of the metals of Groups I through VIII of the Periodic Table of the Elements. Specific metals include platinum, palladium, nickel, cobalt, tungsten and molybdenum.

Low Acid Activity Molecular Sieve

The hydrodealkylation reaction zone contains a molecular sieve of low acid activity, typically, which activity can be determined by the alpha value. An alpha value of less than about 150, more specifically, less than about 100, even more specifically, less then about 60, more specifically, less than about 50, to provide a reaction product of increased benzene and/or toluene content is preferred.

Acidity of the described molecular sieves may be reduced to levels suitable to practice the invention by thermal treatment or steam treatment at high temperature as described in U.S. Pat. No. 4,105,537 and in U.S. Pat. No. 3,965,209, respectively. Another method for reducing acidity is to provide basic cations such as sodium at a significant proportion of the cationic sites of the zeolite. That technique is described in U.S. Pat. No. 3,899,544.

In many cases, steaming will be the preferred manner of reducing acidity of the catalyst. That catalyst preparation step may be conducted in situ by passing steam at suitable temperature, generally 1000° F. (538° C.) or higher through catalyst in the reactor for a period of several hours until the desired reaction activity is achieved. Alternatively, the activity can be reduced by exposing the molecular sieve to steam and high temperatures for a period of time sufficient to reduce acid activity. This can be accomplished at temperatures below about 1500° F. (815° C.), typically about 1000° F. (538° C.) for several hours or even days. Typically, steam treatment is conducted for 6 to 168 hours.

Catalysts which were employed in such severe reactions as aromatization of paraffins and olefins lose activity to an extent which makes them suitable for use in the process of this invention. See U.S. Pat. No. 3,960,978 for a discussion of zeolite deactivation in this manner.

Therefore, the reformate upgrading process of this invention can be catalyzed by a spent catalyst comprising a molecular sieve which was deactivated during use in an acid catalyzed reaction. An important feature of the invention is that by virtue of its deactivation, the molecular sieve is of sufficient activity to catalyze the desirable reactions of the reformate upgrading and the deactivating materials, e.g. metallic contaminants and coke, which form a part of the catalyst, do not hinder the ability of the molecular sieve to catalyze these reactions.

Usually, the spent catalysts contemplated are those used in reactions involving zeolites of intermediate pore size. Although these zeolites have unusually low alumina contents, i.e., high silica to alumina ratio, they are very active even when the silica-to-alumina mole ratio exceeds 30. As known in the art, this activity is surprising because catalytic activity is generally attributed to the framework aluminum atoms and/or anions associated with these aluminum atoms. These zeolites retain their crystallinity for long periods of time in spite of the presence of steam at high temperatures which induce irreversible collapse of the framework of other zeolites, e.g. of the X and A types. Furthermore, these zeolites usually have low coke-forming activity and, therefore, are conducive to long times on stream between regenerations (usually by burning at higher than usual temperatures). However, when framework dealuminization does occur, the catalytic activity of this type of zeolite is drastically reduced. Accordingly when the zeolite experiences framework dealuminization, its utility as a catalyst is seriously diminished and it is simply not economically feasible to continue to use the zeolite.

The sources of the spent zeolites may be quite varied. Typically, the deactivated catalyst is deactivated from a refinery oxygenate or hydrocarbon conversion process.

In the case of intermediate pore size zeolites, such as ZSM-5, a catalyst which has become deactivated during the methanol-to-gasoline process, is readily employed in the present process. The methanol-to-gasoline process is specifically described in U.S. Pat. Nos. 3,894,107; 3,979,472; 4,044,065 and 4,255,349. However, as mentioned above, a catalyst which has become deactivated during other known conversion processes such as lube dewaxing, distillate dewaxing, zeolite catalyzed processes for converting olefins to gasoline and distillate, see U.S. Pat. No. 4,150,062 and U.S. Pat. No. 4,021,502, high temperature isomerization, ethyl benzene conversion, and olefins conversion to chemical intermediate (e.g. over ZSM-23) may be used.

The spent methanol-to-gasoline catalyst could not be effectively used in the methanol-to-gasoline process, even after regenerating the catalyst. The deactivated catalyst can be employed in its deactivated state for reformate upgrading without any treatment to reactivate it, in which instance the catalyst must not be so deactivated that it has lost all of its activity. However, in one embodiment of the invention, the deactivated catalyst is employed after it has been regenerated by known techniques such as by regeneration with oxygen or reactivation with hydrogen.

The ability to successfully employ the spent catalyst is unexpected since laboratory analysis has shown that the spent catalysts contain the many metallic contaminants present in the feed and in the processing equipment. The contaminants include iron, calcium, sodium, nickel, phosphorus, titanium, zinc and magnesium. By whatever means the reduced acid activity is achieved, the activity may be measured in terms of acid activity, usually, measured by the alpha value which is typically less than about 150, even more specifically less than about 100. The alpha value is usually less than about 60, specifically less than about 50. Specific ranges of alpha value are from about 1 to 40, more specifically less than 30.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis,* Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis,* Vol. 61, p. 395.

Hydrogenation Component

In one embodiment of the invention, the catalyst comprises a hydrogenation component, typically a metal from group VIII of the Periodic Table of the Elements (CAS version, Sargent-Welch Scientific Company (1979)). Examples of suitable hydrogenation components include cobalt, nickel, platinum and palladium. Other metals such as a Group VIB metal e.g., tungsten and molybdenum may also be employed. Palladium is, however, preferred: it has demonstrated advantages over platinum in its ability to convert the reformate without producing excessive amounts of olefins which lead to increased catalyst aging.

While still achieving hydrodealkylation of the feed, the metal hydrogenation component results in enhanced benzene selectivity, as compared to the zeolite which does not contain a metal hydrogenation component. A portion of the olefins, formed by dealkylating the heavy aromatics, are saturated as they form. This achieves three beneficial results: (1) reduced coke make because any potential coke precursors are saturated; (2) increased benzene production and net conversion of ethylbenzene and $C_9+$ aromatics because of saturation of any intermediate olefins available for aromatics alkylation; and possibly (3) increased dehydrocyclization of $C_6+$ paraffins present in the feed.

The amount of hydrogenation metal can vary, depending upon the amount of hydrocracking activity and desired selectivity. Typically, the amount of hydrogenation metal varies from about 0.05 wt. % to about 5 wt. % by weight of the catalyst, more typically, the amount of hydrogenation metal ranges from about 0.1 wt. % to about 3 wt. %. Less than about 1 wt. %, typically from about 0.2 to about 0.5 wt % hydrogenation metal usually exhibits the desired degree of activity and selectivity.

In a further embodiment, the metal hydrogenation component of the hydrodealkylation catalyst can be contacted with an activity moderating amount of a Group VIA element, especially sulfur. It was found that undesired olefin forming and ring saturating activity attributed to the metal function is moderated by treating the catalyst with sulfur. Typically, this has not been found to inhibit the acid function of the catalyst. This can be accomplished by catalyst pretreatment with sulfur in situ or ex situ. Sulfur treatment can be accomplished in situ by continuously adding a source of sulfur along with the feed or cofeed such as a $C_9+$ stream or a hydrogen stream or intermittently continuously adding a sulfur source to the feed or cofeed during the process by cofeeding sulfur, discontinuing the cofeed and then recontinuing the sulfur cofeed.

Sources of sulfur include any sulfur containing compound capable of moderating the hydrogenation function, examples include alkylsulfides such as dibutylsulfide, methylsulfide, dimethyldisulfide and diethylsulfide. Other sources of sulfur include hydrogen sulfide and carbon disulfide. The amount can vary greatly but typically ranges from about 50 ppmw to about 10,000 ppmw.

The hydrogenation metal can be exposed to the conditions necessary to reduce the acid activity of the molecular sieve. That is the catalyst can be formed, complete with hydrogenation metal, and then subjected to steaming or other acid activity reducing treatment.

Matrix Material

In general, any molecular sieve which is employed in the process of this invention is often associated with a matrix material which is resistant to the temperature and other conditions employed in the processes which they catalyze. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the molecular sieve employed herein may be composited with the porous matrix material, such as alumina, silica, titania, zirconia or combinations thereof, e.g. silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix may vary widely with the zeolite content ranging from between about 1 to about 100 percent by weight and more usually in the range of about 5, more specifically 20 to about 80, more specifically about 100, percent by weight of the composite.

Process Configuration

In the multi-step integrated process the petroleum naphtha is catalytically reformed and the reformate is cascaded to the hydrodealkylation reaction zone.

Figure 1:
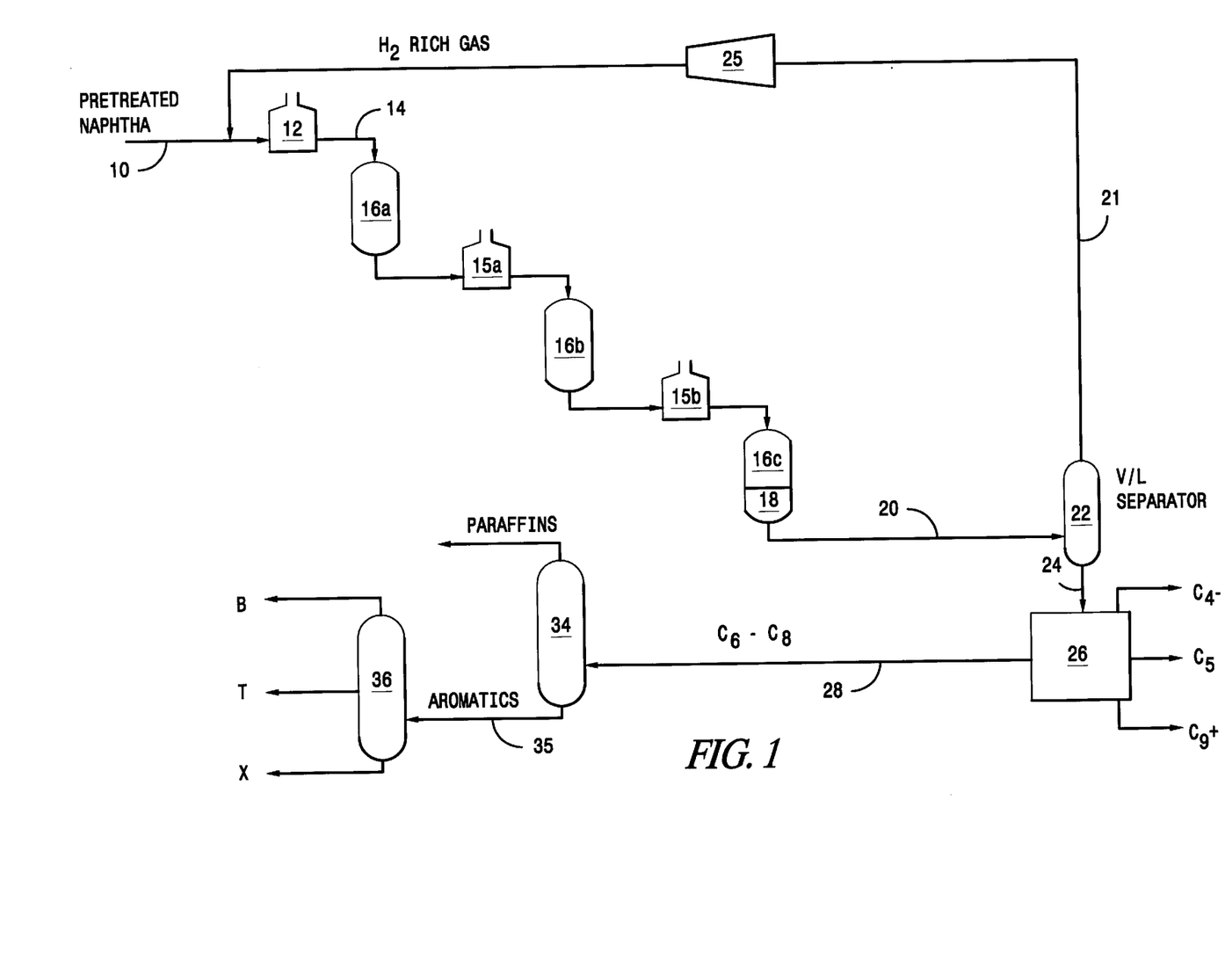
FIG. 1 is a simplified schematic flow diagram of the process of the invention.

FIG. 1 is a simplified schematic flow diagram of one useful process configuration. Referring to FIG. 1, a petroleum naphtha supplied by line 10 is charged to reformer heater 12 which elevates the temperature of the feed to a temperature suitable for reforming. The heated feed is charged to a plurality of reformer reaction zones 16a, 16b and 16c with interstage heaters 15a and 15b. Although three reformer reaction zones are shown, there can be less than three or more than three reaction zones. The bottom portion of the last reformer reaction zone 18 is loaded with the hydrodealkylation catalyst. The feed passes over the hydrodealkylation catalyst just before it exists the reformer to produce a product of increased benzene content as compared to the effluent of the last reforming catalyst zone 16c.

The hydrodealkylation catalyst of reaction zone 18 is typically isolated from the reforming catalyst to maximize its opportunity to work on the products of reforming as opposed to the reformer feed. This can be accomplished by providing a separate reactor or by segregating the catalysts within the same reactor. However, intermingling of the hydrodealkylation catalyst and the reforming catalyst will be difficult to avoid and will not be detrimental.

One reactor bed configuration involves sandwiching the hydrodealkylation catalyst between the reformer catalyst. In this mode of operation, the final reformer catalyst isomerizes and saturates olefins formed by the hydrodealkylation catalyst. Highly branched $C_8$ paraffins present in reformate have a boiling point which is close to that of benzene. This poses difficulties in meeting the benzene purity requirements of the petrochemicals industry. A medium pore size zeolite catalyst, preferably ZSM-5, in a middle portion of the last stage of the reforming reaction zone cracks $C_6+$ paraffins, including these $C_8$ paraffins (cracking selectivity is towards linear and low branched paraffins). Follow-through over the reforming catalyst isomerizes the very branched paraffins to less branched paraffins which boil higher than benzene and facilitate separation of a high purity benzene stream. This configuration also minimizes, and can even eliminate, the presence of light olefins in the effluent.

Usually when the hydrodealkylation catalyst is located within the reformer, regardless of where the hydrodealkylation catalyst is located, a radial flow reactor is particularly suitable to maintain a low pressure drop. The radial flow reactor, particularly in combination with smaller particle size hydrodealkylation catalyst, contributes to improved flow distribution in the last bed of the reformer.

In some operations it will be useful to employ a small particle size catalyst, typically when reactor volume is small or to alleviate pressure drop. A self bound zeolite such as self-bound ZSM-5 is specifically contemplated.

Figure 2:
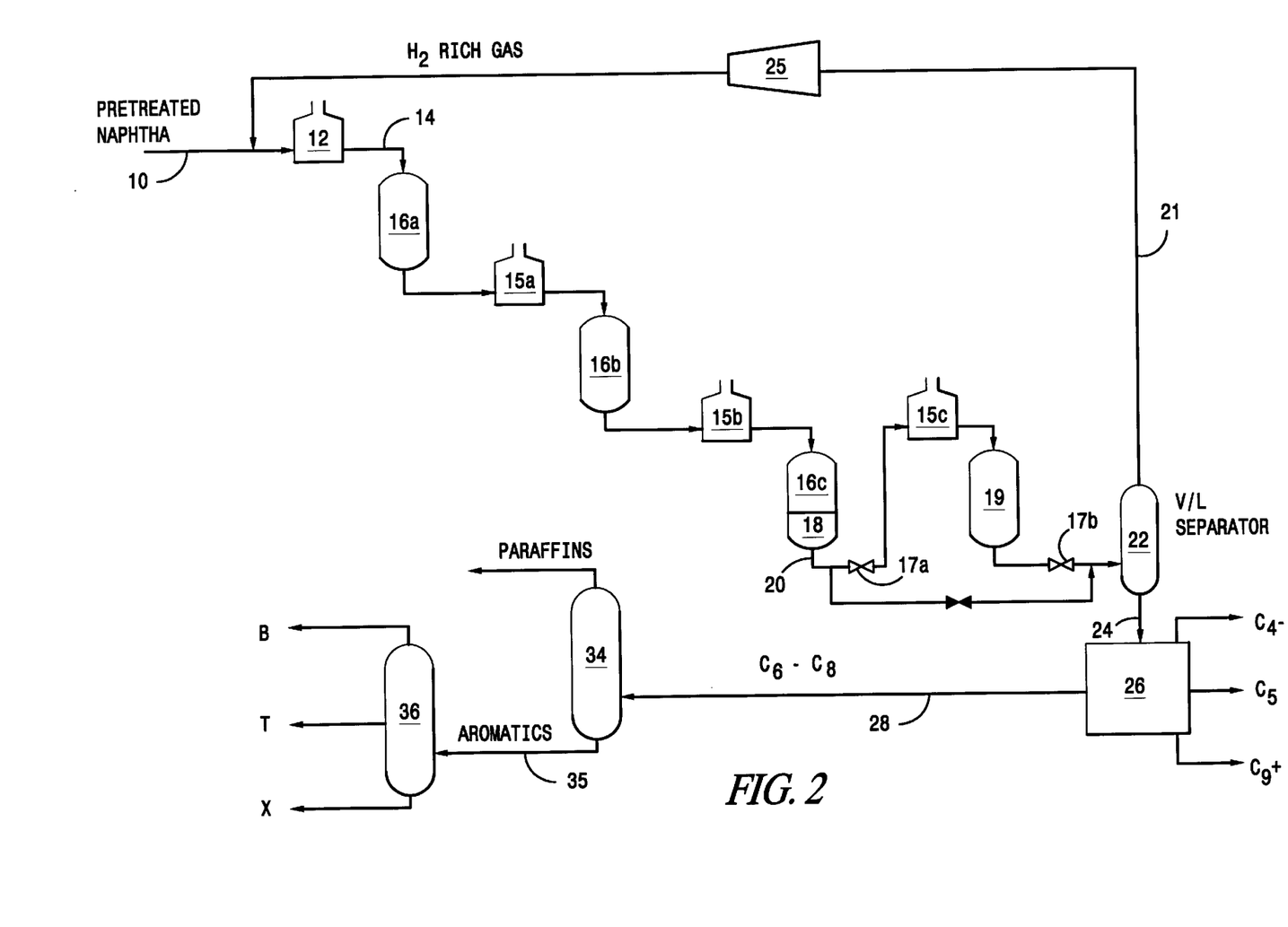
FIG. 2 is a simplified schematic flow diagram of an alternative embodiment of the invention.

FIG. 2 shows an embodiment of the invention in which the hydrodealkylation catalyst is located in a separate reactor 19 associated with switching valves 17a and 17b which, optionally, enable the catalyst zone to be removed from on-line contact during at least a portion of regeneration of the reformer catalyst. This will be more useful when the metal hydrogenation component, particularly platinum, is used or when the reformer contains a moving or fluidized catalyst bed. Optionally, heater 15c is located between the last reactor of the reformer and the hydrodealkylation catalyst reactor 19.

Referring to both FIGS. 1 and 2, after cooling, the aromatics rich product is passed to vapor/liquid separator 22 which separates a hydrogen-rich gas via hydrogen compressor 25 for recycling to the reformer via line 21. Via line 24, the liquid product is conveyed from separator 22 to fractionator 26 is, typically a series of fractionators that separate the product into $C_4-$, $C_5$, $C_6-C_8$ and $C_9+$ hydrocarbon streams. The $C_9+$ aromatics can be separated and recycled to the reformer or the hydrodealkylation reactor to increase yield. The $C_6$ to $C_8$ stream of fractionator 26 is transferred by line 28 to a paraffin separator 34 which separates the paraffins from the aromatics, typically, by solvent extraction. The aromatics extract can then be conveyed via line 35 to separation zone 36 which separates the extract into benzene, toluene and xylenes streams. An important advantage of the invention is a low consumption of hydrogen. Typically, hydrogen consumption is less than about 200 SCFB (35.6 n.l.l.$^{-1}$), more typically, ranging from about 0 SCFB (0 n.l.l$^{-1}$) to about 100 S.C.F.B. (17.8 n.l.l.$^{-1}$), more typically less than about 50 SCFB (8.9 n.l.l.$^{-1}$). This low hydrogen consumption can be particularly advantageous when there is a need to balance a high hydrogen consumption in the reformer.

The hydrodealkylation catalyst can be exposed to the conditions of the reformer during rejuvenative treatment of the reformer catalyst. Particular advantages are associated with palladium, as opposed to platinum, as the hydrogenation component of the hydrodealkylation catalyst after rejuvenative treatment of the reformer catalyst. That is, palladium-containing catalysts have been found to withstand the rejuvenative treatment better than platinum-containing catalysts. Typically, the reformer catalyst is rejuvenated by oxychlorination but any rejuvenating method is contemplated.

The hydrodealkylation catalyst may be reactivated by the rejuvenative treatment of the reformer catalyst. However, other methods known for reactivating the catalyst may be employed such as burning with oxygen, regeneration with hydrogen or an inert gas such as nitrogen.

EXAMPLES

Example 1

This example demonstrates the results of hydrodealkylating a reformate under conditions compatible with the reformer.

A steamed zeolite H-ZSM-5 having an alpha value of 16 is evaluated for effectiveness in hydrodealkylating a full range reformate, described in Table 1, under conditions of temperature, pressure and $H_2$/HC ratio compatible with reforming.

The reformate has the following composition:

TABLE 1

| Full Range Reformate | wt % |
|---|---|
| $C_4-$ | 0.45 |
| $C_5-C_8$ (saturated) | 25.47 |
| benzene | 6.31 |
| toluene | 17.80 |
| $C_8$ aromatics | 22.25 |
| $C_9+$ | 27.72 |
| $C_5+$, R + O (calculated) | 101.00 |

The hydrodealkylation reactions are carried out under the following conditions:

TABLE 2

| Pressure, psig | 200 |
|---|---|
| Temperature, °F. | 902 |
| WHSV | 7.8 |
| $H_2$/HC ratio | 5/1 |

The catalyst is heated in flowing hydrogen. Once the desired temperature is achieved, the reformate feedstock is introduced. The results set forth in the following Table 3 show the formation of benzene, toluene and xylenes. The reduction in $C_9+$ hydrocarbons demonstrates that the gasoline. boiling range portion of the product has a reduced $C_9+$. The process also achieved a substantial increase in octane.

TABLE 3

| $C_4-$ | 9.49 |
|---|---|
| $C_4-$ (saturated) | 16.88 |
| benzene | 8.68 |
| toluene | 21.28 |
| $C_8$ aromatics | 20.93 |
| $C_9+$ | 22.74 |
| $C_5+$, R + O (calculated) | 104.15 |

An ethylbenzene conversion of 38.5% is observed. Comparing the data of Tables 1 and 3, it is clear that the present process achieves a significant increase in benzene, toluene and xylenes (BTX) production rate and concentration. The total $C_6-C_8$ aromatics content of the reformate, as reported in Table 1, is 46.36. Table 3 reports a $C_6-C_8$ aromatics content of 50.89, which amounts to a 4.53 wt. % increase. Although this may appear small, in the refinery setting even incremental increases in the more valuable products are important. The reduction in $C_9+$ hydrocarbons has a positive effect on gasoline blending to meet $T_{90}$ requirements. A substantial increase in the calculated octane value is also achieved by the present invention.

Example 2

This example compares products formed by contacting a reformate with a lower activity Ni/ZSM-5 zeolite catalyst ($SiO_2/Al_2O_3$=1600) and a higher activity Ni/ZSM-5 zeolite catalyst ($SiO_2/Al_2O_3$=70). In this example the temperature of reaction is 900° F., pressure is 200 psig, space velocity is 20.00 (W.H.S.V.) and the hydrogen/hydrocarbon ratio is 5. The feed and the product hydrocarbon distribution in terms of weight percent is reported in Table 4.

TABLE 4

| Hydrocarbon Distribution (wt. %) | Reformate Chargestock | $SiO_2:Al_2O_3 = 70$ Product 1 | $SiO_2:Al_2O_3 = 1600$ Product 2 |
|---|---|---|---|
| $C_1$—$C_4$ | 0.9 | 29.46 | 4.71 |
| $C_6$—$C_9$ (aromatics) | 55.9 | 55.53 | 57.89 |
| $C_{10}$ (aromatics) | 4.5 | 4.87 | 3.15 |
| $C_{11}$—$C_{12}$ (aromatics) | 1.0 | 1.59 | 0.45 |
| $C_{13}+$ | 0.2 | 0.79 | 0.10 |
| Net % conversion $C_9+$ | — | 26.95 | 27.87 |
| Net % conversion $C_5$—$C_6$ paraffins | — | 65.21 | −3.0 |

The data reported in Table 4 demonstrate how zeolites of different acid activity result in different products. Even at about the same $C_9+$ conversion, the catalyst of lower acid activity ($SiO_2:Al_2O_3=1600$) obtains a net % conversion of $C_5$–$C_6$ paraffins of −3.0. By contrast, the net % conversion of $C_5$–$C_6$ is 65.21 using a higher acid activity catalyst ($SiO_2/Al_2O_3=70$). Additionally, with the low activity zeolite the $C_{13}+$ hydrocarbons are reduced even over the feed while the more active catalyst increases the content of $C_{13}+$ hydrocarbons.

Example 3

This example demonstrates the results of hydrodealkylating a reformate under conditions compatible with the reformer using a low acidity catalyst which includes a metal hydrogenation component.

A platinum ZSM-5 having an alpha value of 10–15 is evaluated for effectiveness in hydrodealkylating a full range reformate, described in the following Table 5 under conditions of temperature, pressure and $H_2$/HC ratio compatible with reforming, the temperature is 921° F., pressure is 300 psig, W.H.S.V. is 20 and hydrogen to hydrocarbon mole ratio of 5:1.

TABLE 5

| Full Range Reformate | wt % |
|---|---|
| $C_4$— | 0.11 |
| $C_5$—$C_8$ | 18.93 |
| benzene | 5.56 |
| toluene | 19.02 |
| ethylbenzene | 3.55 |
| xylenes | 21.40 |
| $C_9+$ | 29.46 |

The results set forth in the following Table 6 show the formation of benzene, toluene and xylenes.

TABLE 6

| | |
|---|---|
| $C_4$-(saturated) | 5.15 |
| $C_5$—$C_8$ | 15.68 |
| benzene | 8.48 |
| toluene | 24.92 |
| ethylbenzene | 1.72 |
| xylenes | 22.93 |
| $C_9+$ | 21.22 |

Although the feeds differed slightly, a comparison between the results of this example with the results of Example 1, demonstrates the advantages of using a metal hydrogenation component in the process of this invention. Fewer $C_4$– components form and of the light hydrocarbons produced, all are saturated over the catalyst of this example, while in Example 1 olefins are produced (coke precursors). The product toluene increase over the feed is greater and even though the feed of this example contained more $C_9+$ hydrocarbons than the feed of Example 1, a greater reduction in the $C_9+$ components is achieved (21.22 vs. 22.74).

Example 4

This example compares the results of contacting a reformate with fresh and spent catalysts. Both catalysts have an alpha value of 9.

The spent catalyst is removed from a methanol-to-gasoline unit and contains metallic contaminants as set forth in Table 7:

TABLE 7

| Metals | ppm |
|---|---|
| Iron | 1230 |
| Calcium | 330 |
| Nickel | 210 |
| Phosphorus | 88 |
| Titanium | 75 |
| Zinc | 110 |
| Magnesium | <82 |
| Sodium | 210 |

The catalysts are contacted with a full range reformate under the conditions of Table 8.

TABLE 8

| Reaction Conditions | |
|---|---|
| Pressure, psig | 300 |
| Temperature, °F. | 920 |
| WHSV, hr$^{-1}$ | 20 |
| $H_2$/HC ratio | 5/1 |

The results of the upgrading process are reported in Table 9. The amounts are reported in terms of weight %.

TABLE 9

| | | Catalyst | |
|---|---|---|---|
| | Feed | Fresh | Spent |
| $C_4$— | 0.35 | 2.39 | 1.44 |
| $C_5$—$C_6$ | 23.05 | 16.85 | 19.53 |
| benzene | 5.56 | 6.55 | 6.59 |
| toluene | 18.37 | 21.37 | 21.04 |
| ethylbenzene | 3.41 | 3.22 | 3.24 |
| xylenes | 20.66 | 22.45 | 21.49 |
| $C_9+$ | 28.60 | 27.20 | 26.69 |

Comparing the products of Table 9, the spent catalyst (taken from a methanol to gasoline process) not only produces a substantially equivalent gasoline product as the fresh catalyst, but makes fewer $C_4$– and $C_9+$ hydrocarbons. Additionally, the spent catalyst increases yield of gasoline ($C_5$–$C_8$ hydrocarbons). Although not shown in the tables, of the $C_5$–$C_8$ yield, a greater percentage of the more desirable olefins and branched materials are formed over the spent catalyst (wt. % olefins and branched $C_5$ to $C_8$, 13.61 vs. 8.92).

Example 5

This example compares the performance of various reformate upgrading catalysts in upgrading a reformate.

Catalyst A—Steamed Platinum/ZSM-5

A physical mixture of 50 parts ZSM-5 ($SiO_2/Al_2O_3$ ratio of ~55), platinum solution and 50 parts pseudoboehmite alumina powder is mulled to form a uniform mixture. All components are blended based on parts by weight on a 100% solids basis, excluding platinum. The platinum solution contains platinum tetraamine chloride to target 0.1 wt. % platinum. Sufficient amount of deionized water is added to form an extrudable paste. The mixture is auger extruded to 1/16" cylindrical shape extrudates and dried on a belt drier at 127° C. The extrudates are then nitrogen calcined at 480° C. for 3 hours followed by a 6 hour air calcination at 538° C. The calcined catalyst is steamed at 550° C. for 24 hours.

Catalyst B—Steamed Palladium/ZSM-5

A physical mixture of 65 parts ZSM-5 (SiO2/Al2O3 ratio of ~55), solution, and 35 parts pseudoboehmite alumina powder is mulled to form a uniform mixture. The components are blended based on parts by weight on a 100% solids basis excluding palladium. The palladium solution contains palladium tetraammine chloride to target 0.3 wt % palladium, by weight of the catalyst. Sufficient amount of deionized water is added to form an extrudable paste. The mixture is auger extruded to 1/16" cylindrical shape extrudates and dried on a belt drier at 127° C. The extrudates are then nitrogen calcined at 480° C. for 3 hours followed by a 6 hour air calcination at 538° C. The calcined catalyst is steamed at 550° C. for 72 hours.

Catalyst C—Spent HZSM-5

A physical mixture of 65 parts ZSM-5 (SiO2/Al2O3 ratio of ~55) and 35 parts pseudoboehmite alumina powder is mulled to form a uniform mixture. All components are blended based on parts by weight on a 100% solids basis. Sufficient amount of deionized water is added to form an extrudable paste. The mixture is auger extruded to 1/16" cylindrical shape extrudates and dried on a belt drier at 127° C. The extrudates are then nitrogen calcined at 480° C. for 3 hours followed by a 6 hour air calcination at 538° C. Then the catalyst is used in a commercial hydrocarbon conversion process for 2 years and regenerated to remove coke built in the catalyst.

Catalyst D—Spent Palladium/ZSM-5

A physical mixture of 50 parts ZSM-5 ($SiO_2/Al_2O_3$ ratio of ~55) and 35 parts pseudoboehmite alumina powder is mulled to form a uniform mixture. All components are blended based on parts by weight on a 100% solids basis. Sufficient amount of deionized water is added to form an extrudable paste. The mixture is auger extruded to 1/16" cylindrical shape extrudates and dried on a belt drier at 127° C. The extrudates are nitrogen calcined at 480° C. for 3 hours followed by a 6 hour air calcination at 538° C. The catalyst is used in a commercial hydrocarbon conversion process for 2 years and regenerated to remove coke. The used extrudates are impregnated with 0.3 wt. % palladium using an incipient wetness method with palladium tetraamine chloride solution. The impregnated extrudates are dried at 120° C. overnight and calcined at 370° C. for 3 hours.

Catalyst E—Spent Tungsten/ZSM-5

A physical mixture of 65 parts ZSM-5 ($SiO_2/Al_2O_3$ ratio of ~55) and 35 parts pseudoboehmite alumina powder is mulled to form a uniform mixture and formed into 1/16" cylindrical shape extrudates using a standard augur extruder. All components are blended based on parts by weight on a 100% solids basis. The extrudates are dried on a belt drier at 127° C. and are then nitrogen calcined at 480° C. for 3 hours followed by a 6 hour air calcination at 538° C. The catalyst is used in a commercial hydrocarbon conversion process for 2 years and regenerated to remove coke built in the catalyst. The used extrudates are impregnated with 3.5 wt. % tungsten and 2 wt. % phosphorus using an incipient wetness method with a solution of ammonium metatungstate and phosphoric acid. The impregnated extrudates are then dried at 120° C. overnight and calcined at 500° C. for 3 hours.

Catalyst F—Steamed Palladium/zeolite beta

A physical mixture of 65 parts zeolite beta (SiO2/Al2O3 ratio of ~40), palladium solution, and 35 parts pseudoboehmite alumina powder is mulled to form a uniform mixture. The components are blended based on parts by weight on a 100% solids basis excluding palladium. The palladium solution contains palladium tetraammine chloride to target 0.6 wt % palladium. Sufficient amount of deionized water is added to form an extrudable paste. The mixture is auger extruded to 1/16" cylindrical shape extrudates and dried on a belt drier at 127° C. The extrudates are then nitrogen calcined at 480° C. for 3 hours followed by a 6 hour air calcination at 538° C. The calcined catalyst is steamed at 550° C. for 72 hours.

The properties of catalysts A–F are listed in Table 10.

TABLE 10

Catalyst Properties

| | Catalyst | | | | | |
|---|---|---|---|---|---|---|
| | A | B | C | D | E | F |
| Description | *Pt/ZSM-5 | *Pd/ZSM-5 | **H/ZSM-5 | **Pd/ZSM-5 | **W/ZSM-5 | *Pd/Beta |
| Surface area, m²/g | 303 | 295 | 294 | 293 | 270 | 370 |
| n-hexane sorption, wt. % | 9.5 | 10.0 | 9.2 | 8.8 | 8.6 | — |
| cy-hexane sorption, wt. % | 9.3 | — | 8.3 | — | — | 13.0 |
| alpha value | 20 | 17 | 6 | 9 | 6 | 10 |
| alpha value, after oxychlorination | 54 | 21 | 6 | 12 | 6 | — |

*steamed
**spent

The results of upgrading a reformate at 950° F. (510° C.), 20 and 30 W.H.S.V., after rejuvenating the reformate catalyst via oxychlorination, are reported in Table 11.

TABLE 11

| | Catalyst | | | | |
|---|---|---|---|---|---|
| | B | C | D | E | F |
| | *Pd/ZSM-5 | **H/ZSM-5 | **/Pd ZSM-5 | **W/ZSM-5 | *Pd/beta |
| W.H.S.V. | 30 | 20 | 20 | 20 | 30 |
| | Feed, wt. % | Product composition, wt. % | | | |
| Benzene | 5.6 | 8.6 | 7.4 | 8.1 | 7.7 | 6.6 |
| Toluene | 15.0 | 19.7 | 18.0 | 19.1 | 18.2 | 18.0 |
| Xylenes | 17.5 | 18.2 | 18.0 | 18.4 | 18.2 | 20.1 |
| $C_5+$ | 97.8 | 90.8 | 93.8 | 92.3 | 92.9 | 89.6 |
| $C_4-$ | 2.2 | 9.5 | 6.3 | 8.0 | 7.3 | 10.6 |

TABLE 11-continued

| | | | | | | |
|---|---|---|---|---|---|---|
| $C_4=$, olefin, | 0 | 0.2 | 2.5 | 0.3 | 0.9 | 0.1 |

*steamed
**spent

The results reported in Table 11 compare the performance of steamed Pd/ZSM-5 (Catalyst B) and steamed Pd/zeolite beta (Catalyst F) at 30 W.H.S.V. and 510° C. The results show that steamed Pd/ZSM-5 is particularly effective for making benzene and toluene while steamed Pd/beta is most effective for making xylenes. Although not shown in the Table, steamed Pd/beta produces additional 2.6 wt % xylenes over the xylenes of the feed while steamed Pd/ZSM-5 produces only 0.7 wt % xylenes over the xylenes of the feed which is more than three times the incremental xylenes.

The results of upgrading a reformate at 920° F. (493° C.) and 30 W.H.S.V., after rejuvenating the reformate catalyst via oxychlorination are reported in Table 12. The feed employed is the same as that described in Table 11.

TABLE 12

| | Catalyst | | | | | |
|---|---|---|---|---|---|---|
| | A | B | C | D | E | F |
| Description | *Pt/ ZSM-5 | *Pd/ ZSM-5 | **H/ ZSM-5 | **Pd/ ZSM-5 | **W/ ZSM-5 | * Pd/ beta |
| Product, wt. % | | | | | | |
| Benzene | 8.3 | 8.2 | 6.9 | 7.3 | 7.0 | 6.5 |
| Toluene | 19.4 | 18.7 | 17.1 | 17.9 | 17.0 | 17.2 |
| Xylenes | 18.1 | 17.8 | 17.9 | 18.1 | 17.9 | 18.7 |
| Yields, wt. % | | | | | | |
| $C_5+$ | 88.4 | 92.6 | 95.2 | 94.4 | 94.9 | 94.2 |
| $C_4-$ | 12.0 | 7.6 | 4.8 | 5.8 | 5.2 | 5.9 |
| $C_4=$, olefin | 0.0 | 0.4 | 1.9 | 0.4 | 0.9 | 0.1 |

*steamed
**spent

Results reported in Table 12 show that each catalyst effectively increases the benzene, toluene and xylenes of a reformate. However, steamed H-ZSM-5 (Catalyst C) produces a significant amount of olefins. Steamed Pd/ZSM-5 (Catalyst B) produces comparable or more benzene, toluene and xylenes than H-ZSM-5 and produces fewer olefins ("$C_4-$ olefins") and steamed Pd/zeolite beta (Catalyst F) also demonstrates better xylenes selectivity. Although not shown in the Table, steamed Pd/beta produces 1.2 wt % xylenes over the wt. % xylenes of the feed. This is over three times the amount of xylenes produced by steamed H-ZSM-5 and steamed Pd/ZSM-5.

The data of Table 12 also show that both Pd/ZSM-5 catalysts and Pt/ZSM-5 are more active than H-ZSM-5 and W/ZSM-5. However, H-ZSM-5 is less desirable because of excessive olefin production. The Pt/ZSM-5 shows non-selective cracking in the production of large quantities of $C_4-$ and low $C_5+$ gasoline yield. Both steamed and spent Pd/ZSM-5 offer a good combination of cracking activity and metal hydrogenation activity which are shown in the good production of benzene, toluene and xylenes and gasoline yields with only a small formation of olefins. Spent W/ZSM-5 does not demonstrate as much effectiveness as Pd/ZSM-5 in suppressing olefin production although the $C_4-$ content is low.

Example 6

This example demonstrates the advantages of adding an amount of sulfur as a cofeed to moderate the metal function of the catalyst. In this example, the catalyst is steamed ZSM-5 having an alpha value of about 20 before oxychlorination about 54 after oxychlorination of the reforming catalyst and containing 0.1 wt. % platinum. The upgrading was operated over the oxychlorinated catalyst at a temperature of 920° F. (493° C.), pressure of 325 psig (2,342 kPa), W.H.S.V. of 45 and a hydrogen to hydrocarbon mole ratio of 6:1.

TABLE 13

| Reformate Upgrading with Sulfur Addition | | |
|---|---|---|
| | Feed | Products |
| Time On Stream, hours | | 50      74 |
| sulfur cofeed, 400 pppm | | No     Yes |
| $C_4-$ | 2.3 | 11.0    7.8 |
| $C_5+$ | 97.7 | 89.4   92.3 |
| $C_9$ aromatics | 19.9 | 15.4   15.6 |
| Benzene | 5.8 | 7.9     8.0 |
| Toluene | 15.6 | 18.6    19.1 |
| Xylenes | 17.9 | 18.0    18.3 |
| $H_2$ Consumed, SCF/B | | 183.1   74.9 |
| Benzene increase | | 1.4     1.4 |
| Toluene increase | | 1.2     1.2 |

The results reported in Table 13 demonstrate that adding sulfur as a cofeed effectively moderates the platinum function by inhibiting the tendency of platinum to make $C_4-$ while retaining benzene, toluene and xylenes production. Additionally, hydrogen consumption is reduced.

Example 7

This example illustrates the performance of a mixture of zeolite beta and ZSM-5 in reformate upgrading. A 50:50 catalyst mixture is made from 0.6 wt. % palladium zeolite beta and catalyst F (steamed 0.3 wt. % palladium ZSM-5). The test conditions are 920° F. (493° C.), 30 W.H.S.V., and pressure of 320 p.s.i.g. (2307.7 kPa).

TABLE 14

| Reformate Upgrading with Catalyst Mixture | | |
|---|---|---|
| | | Products Catalyst |
| | Feed | 50/50 mixture | F |
| $C_4-$ | 2.2 | 9.2 | 5.9 |
| $C_5+$ | 97.8 | 91.1 | 94.2 |
| Benzene | 5.6 | 7.5 | 6.5 |
| Toluene | 15.0 | 18.5 | 17.2 |
| Xylenes | 17.5 | 18.9 | 18.7 |

The results of Table 14 demonstrate that mixing zeolite beta and ZSM-5 improves benzene and toluene production over zeolite beta alone.

What is claimed is:

1. A multistage integrated process for upgrading a petroleum naphtha comprising the steps of (a) introducing the naphtha to a catalytic reforming stage comprising a plurality of operatively connected catalyst zones including a first catalyst zone and a last catalyst zone, the last catalyst zone being maintained under reforming conditions of temperature ranging from at least 800° F. (427° C.) to 1050° F. (565° C.) and pressure of 50 psig (446 kPa) to 500 psig (3,549 kPa) to provide an intermediate product comprising aromatics and paraffins;

(b) transferring at least a portion of the intermediate product of the last catalyst zone to a benzene and toluene synthesis zone comprising at least one benzene and toluene synthesis catalyst operatively connected to the last catalyst zone of the reforming stage of step (a), the benzene and toluene synthesis zone being maintained under conditions of hydrogen-to-hydrocarbon mole ratio and pressure compatible with the last catalyst zone of the reforming stage and temperature of greater than 800° F. (427° C.), the benzene and toluene synthesis catalyst zone containing a catalyst comprising a molecular sieve of low acid activity, as determined by an alpha value of less than 60, to provide a hydrocarbon product of higher benzene and toluene content than the intermediate product of the last catalyst zone of the reforming stage;

wherein the intermediate product of step (a) that is fed to the benzene and toluene synthesis zone of step (b) has not been subjected to intermediate separation.

2. The process as described in claim 1 in which the catalyst of step (b) comprises ZSM-5 having an alpha value less than 50.

3. The process as described in claim 1 in which the benzene content of the intermediate product of step (a) is increased by at least 10% in step (b).

4. The process as described in claim 1 in which the catalyst of step (b) further comprises a metal hydrogenation component.

5. The process as described in claim 4 in which the metal hydrogenation component is a metal selected from Group VIB or VIII of the Periodic Table of the Elements.

6. The process as described in claim 1 in which the catalyst of step (b) comprises platinum or palladium and ZSM-5.

7. The process as described in claim 5 in which the metal hydrogenation component is cobalt, nickel, platinum, palladium, molybdenum or tungsten.

8. The process as described in claim 1 in which the molecular sieve is zeolite beta.

9. The process as described in claim 1 in which the catalyst of step (b) comprises a catalyst deactivated in another refinery oxygenate or hydrocarbon conversion process.

10. The process as described in claim 1 which the hydrocarbon product of step (b) further comprises branched $C_6+$ paraffins, the process further comprising step (c) of contacting the hydrocarbon product of step (b) over a catalyst zone comprising another catalytic reforming stage which isomerizes the branched $C_6+$ paraffins.

11. The process as described in claim 1 in which the catalyst of step (b) further comprises sulfur.

12. The process as described in claim 11 in which a source of sulfur is a cofeed introduced in step (b).

13. The process of claim 1 in which at least the catalyst zone of step (a) is a radial flow reactor zone.

14. The process of claim 1 in which at least the zone of step (b) is a radial flow reactor zone.

15. The process of claim 2 in which the catalyst of step (b) is self-bound ZSM-5.

16. The process of claim 2 in which the catalyst of step (b) further comprises zeolite beta.

17. The process of claim 13 in which the zone of step (b) is a fixed bed zone.

18. The process of claim 1 in which the hydrogen consumption is less than 200 SCF/B.

19. The process of claim 1 in which the benzene and toluene synthesis zone of step (b) comprises a hydrogen quench.

20. The process of claim 1 in which the hydrocarbon product of step (b) comprise $C_9+$ hydrocarbons, the process further comprising separating the $C_9+$ hydrocarbons from the product of step (b) and recycling the $C_9+$ hydrocarbons to step (a) or step (b).

21. The process of claim 1 which further comprises a $C_9+$ aromatic cofeed in step (a) or step (b).

22. The process of claim 1 in which the petroleum naphtha is free of $C_6-$ hydrocarbons.

23. The process of claim 1 in which the end boiling range of the petroleum naphtha contains from 20 to 40 wt. % $C_9+$ hydrocarbons.

24. The process of claim 1 in which the molecular sieve of step (b) comprises zeolite beta.

25. The process of claim 2 in which the catalyst of step (b) is subjected to steaming.

26. The process of claim 1 in which the product of step (b) further comprises a xylenes content which is higher than the intermediate of the last catalyst zone of the reforming stage.

* * * * *